United States Patent
Maziers

(10) Patent No.: US 9,061,260 B2
(45) Date of Patent: Jun. 23, 2015

(54) METHOD FOR ADDITIVATING POLYMERS IN ROTOMOULDING APPLICATIONS

(75) Inventor: Eric Maziers, Seneffe (BE)

(73) Assignee: TOTAL RESEARCH & TECHNOLOGY FELUY, Seneffe, Feluy (BE)

(*) Notice: Subject to any disclaimer, the term of this patent is extended or adjusted under 35 U.S.C. 154(b) by 1115 days.

(21) Appl. No.: 13/120,671

(22) PCT Filed: Oct. 1, 2009

(86) PCT No.: PCT/EP2009/062751
§ 371 (c)(1),
(2), (4) Date: May 19, 2011

(87) PCT Pub. No.: WO2010/037811
PCT Pub. Date: Apr. 8, 2010

(65) Prior Publication Data
US 2011/0224338 A1 Sep. 15, 2011

(30) Foreign Application Priority Data
Oct. 2, 2008 (EP) .................................. 08165700

(51) Int. Cl.
*C08K 5/49* (2006.01)
*B01F 15/06* (2006.01)
*B01F 7/00* (2006.01)
*C08J 3/20* (2006.01)
*C08K 5/00* (2006.01)
C08K 5/134 (2006.01)
C08K 5/3435 (2006.01)
C08K 5/3492 (2006.01)
C08K 5/526 (2006.01)

(52) U.S. Cl.
CPC ............ B01F 15/065 (2013.01); B01F 7/00775 (2013.01); B01F 2015/061 (2013.01); C08J 3/203 (2013.01); C08J 2323/04 (2013.01); C08K 5/005 (2013.01); C08K 5/1345 (2013.01); C08K 5/3435 (2013.01); C08K 5/34926 (2013.01); C08K 5/526 (2013.01)

(58) Field of Classification Search
USPC .................................. 524/100, 133, 147, 115
See application file for complete search history.

(56) References Cited

U.S. PATENT DOCUMENTS

| 4,025,480 A | 5/1977 | Larsen | |
|---|---|---|---|
| 6,719,941 B1 | 4/2004 | Frohaug et al. | |
| 2002/0156165 A1* | 10/2002 | Webster | 524/323 |
| 2003/0146542 A1 | 8/2003 | Fatnes et al. | |
| 2008/0103264 A1* | 5/2008 | Maziers | 525/418 |
| 2009/0048393 A1* | 2/2009 | Fouarge et al. | 524/582 |

FOREIGN PATENT DOCUMENTS

WO 2005/118709 A1 12/2005

OTHER PUBLICATIONS

Office Action issued in Korean Patent Application No. 2011-7007505 mailed Sep. 28, 2012, and an English translation thereof (9 pages).

* cited by examiner

Primary Examiner — Wenwen Cai

(57) ABSTRACT

This invention relates to a method for additivating polymer resins with antioxidants and antiUV stabilsers. It is particularly suitable for resins used for rotomoulding applications.

14 Claims, 8 Drawing Sheets

METHOD FOR ADDITIVATING POLYMERS IN ROTOMOULDING APPLICATIONS

CROSS-REFERENCE TO RELATED APPLICATIONS

This application claims the benefit of PCT/EP2009/062751, filed Oct. 1, 2009, which claims priority from EP 08165700.9, filed Oct. 2, 2008.

This invention relates to the field of additivation of polymer resins with antioxidants and antiUV stabilisers. It is particularly suitable for resins used rotomoulding applications.

Polyethylene represents more than 80% of the polymers used in the rotomoulding market. This is due to the outstanding resistance of polyethylene to thermal degradation during processing, to its easy grinding, good flowability, and low temperature impact properties.

Rotomoulding is used for the manufacture of simple to complex, hollow plastic products. It can be used to mould a variety of materials such as polyethylene, polypropylene, polycarbonate polyamide, or polyvinyl chloride (PVC). Linear low density polyethylene is preferably used as disclosed for example in "Some new results on rotational molding of metallocene polyethylenes" by D. Annechini, E. Takacs and J. Vlachopoulos in ANTEC, vol. 1, 2001.

Polyethylenes prepared with a Ziegler-Natta catalyst are generally used in rotomoulding, but metallocene-produced polyethylenes are desirable, because their narrow molecular distribution allows better impact properties and shorter cycle time in processing.

The metallocene-produced polyethylenes of the prior art (see ANTEC, vol. 1, 2001) suffer from high shrinkage and warpage and for some applications from their whiteness in their natural state.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerisation of these polymer alloys requires a complex catalyst system comprising organometallic catalyst precursors, cationic forming cocatalysts and cross-over agents.

Polyethylene fluff exiting the reactor requires the presence of stabilisers before it can be used in rotomoulding applications. These stabilisers include UV-stabilisers to prevent degradation before and during and after the rotomoulding process. They also include antioxidants. Several methods have been used to combine these stabilisers with the polymer.

For example, the polymer and additives can be mixed in an extruder which applies shear force to mix the components and melts the polymer. This method suffers the disadvantage of modifying the properties of the polymer and of consuming energy.

In another method, the stabilisers can be dissolved in a solvent and sprayed over polymer pellets that have already been conditioned for rotomoulding, such as disclosed for example in EP-A-1261660 or in WO00/11065. This method suffers from the disadvantage that the solvent is still included in the finished product.

In yet another method, the stabilisers can be dry blended with the polymer particles already conditioned for rotomoulding. This method suffers from the disadvantage that the mixing is not completely homogeneous.

There is thus a need for a method that does not suffer from these drawbacks.

It is an aim of the present invention to mix stabilisers and polymer without using solvents.

It is another aim of the present invention to limit the number of conditioning steps necessary to prepare the ready-for-rotomoulding resin.

It is also an aim of the present invention to reduce the energy consumption necessary to prepare the ready-for-rotomoulding resin.

It is yet another aim of the present invention to reduce the cost for preparing the ready-for-rotomoulding resin.

Accordingly the present invention discloses a method for additivating polymer resin for rotomoulding applications that comprises the steps of:

a) feeding into a microniser a mixture comprising:
 i) polymer fluff directly exiting the reactor;
 ii) phenolic antioxidant
 iii) organic phosphite or phosphonite antioxidant
 iv) anti-UV stabiliser
 v) optionally metal stearate
 vi) optionally densification aid
 vii) optionally pigments
b) micronising the mixture of step a), while maintaining the mixture at a temperature of from room temperature (about 25° C.) to at least 5° C. below the melting temperature of the polymer resin, in order to obtain additivated polymer powder having an homogeneous size of from 10 to 1000 micrometres as requested for rotomoulding;
c) retrieving the additivated polymer powder, ready for direct use in rotomoulding applications.

The present method offers the advantage that no pre-treatment is needed prior to feeding the mixture of polyethylene and additives to the mill. Pre-treatments that are are avoided in the present invention and are typically used to add the additives to the polymer include compounding or extrusion or use of solvent or diluent. Such pre-treatments are detrimental to the polymer properties. In the present invention, the ex-reactor polymer fluff is simply dry blended with the pure additive powders or pellets and sent to the mill in order to have a dry blend of particles of desired size for rotomoulding applications.

The preferred polymers are polyethylene or polypropylene, more preferably polyethylene.

The phenolic antioxidant that can be used in the present invention are preferably selected from octadecyl 3-(3',5'-di-t-butyl-4-hydroxyphenyl)propionate (CAS-n°2082-79-3, Irganox 1076®) or pentaerythrityl-tetrakis(3-(3',5'-di-t-butyl-4-hydroxyphenyl)propionate (CAN-n°6683-19-8, Irganox 1010®), or a blend thereof. Their amount ranges between 0.01 wt % and 0.5 wt %.

The organic phosphite or phosphonite antioxidant are preferably used in an amount of from 0.01 wt % to 0.5 wt % and can be selected from bis(2-methyl-4,6-bis(1,1-dimethylethyl)phenyl) phosphorous acid ethylester (CAS-n° 14560-60-8, Irgafos 38®), tris-nonylphenyl phosphite (CAS-n° 26523-78-4, Irgafos 168®), tetrakis-(2,4-di-t-butylphenyl)-4,4'-biphenylen-di-phosphonite (CAS-n° 38613-77-3, Irgafos P-EPQ® or phosphorous acid, cyclic butylethyl propandiol, 2,4,6-tri-t-butylphenyl ester (CAS-n° 161717-32-4, Ultranox 641®), or a blend thereof.

The UV-stabilisers are preferably used in an amount of from 0.02 wt % to 1 wt %. They are preferably selected from hindered amine light stabilisers such as for example 1,6-hexanediamine, N,N'-bis(2,2,6,6-tetramethyl-4-piperidinyl)-, polymer with 2,4,6-trichloro-1,3,5-triazine, reaction products with N-butyl-1-butanamine and N-butyl-2,2,6,6- tetramethyl-4-piperidinamine (CAS-n° 192268-64-7, chimassorb 2020®), or poly((6-morpholino-s-triazine-2,4-diyl)(2,2,6,6-tetramethyl-4-piperidyl)iminohexamethylene (2,2,6,6-tetramethyl-4-piperidyl)imino)) (CAS-n°82451-48-7, Cyasorb UV 3346®), or poly((6-((1,1,3,3-tetramethylbutyl)amino)-1,3,5-trazine-2,4-diyl)(2,2,6,6-tetramethyl-4-piperidyl)imino)-1,6-hexaneiyl((2,2,6,6-tetramethyl-4-piperidyl)imino)) (CAS-n° 71878-19-8, Chimasorb 944®, or a blend of CAS-n° 71878-19-8 and butanedoic acid, dimethylester, polymer with '-hydroxy-2,2,6,6-tetramethyl-1-piperidine ethanol (Cyasorb THT4611®), or a blend of CAS-n°71878-19-8 and CAS-n° 65447-77-0 (Cyasorb THT4801®), or a blend thereof.

The metal stearate, if present, is used in an amount of from 0.01 wt % to 0.05 wt % and is preferably selected from zinc or calcium stearate.

The densification aid is preferably present in an amount of from 0.001 wt % to 1 wt %. The densification aid comprises a polyetherester, consisting of a mixture of a polyetherester as major component with a minor component selected from the group consisting of polyether-block co-polyamide, thermoplastic polyurethane, polyethylene glycol and fluoropolymer.

By major component it is meant that such a component makes up more than 50% by weight. By minor component it is meant that such a component makes up less than 50% by weight.

Polyetheresters are copolymers having polyester blocks and polyether blocks. They generally consist of soft polyether blocks, which are the residues of polyetherdiols, and of hard segments, the polyester blocks, which typically result from the reaction of at least one dicarboxylic acid with at least one chain-extending short diol unit. The polyester blocks and the polyether blocks are generally linked by ester linkages resulting from the reaction of the acid functional groups of the acid with the OH functional groups of the polyetherdiol. Polyetheresters can for example be obtained from Du Pont Company under the Hytrel® trademark.

Polyether-block co-polyamides are represented by the general formula

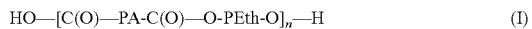

$$HO-[C(O)-PA-C(O)-O-PEth-O]_n-H \qquad (I)$$

wherein PA represents the polyamide segment and PEth the polyether segment. Such materials are commercially available for example from Arkema under the Pebax® trade name.

Polyurethanes that can be used in the present invention generally consist of soft polyether blocks, which can be residues of polyetherdiols, and hard blocks, the polyurethanes, which may result from the reaction of at least one diisocyanate with at least one short diol. The polyurethane blocks and polyether blocks are linked by linkages resulting from the reaction of the isocyanate functional groups with the OH functional groups of the polyether diol. Thermoplastic polyurethanes can for example be obtained from Elastogran GmbH under the Elastollan® trade name or from Dow Chemical Company under the Pellethane® trade name.

Polyethylene glycols that can be used in the present invention have the general formula

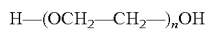

$$H-(OCH_2-CH_2-)_nOH$$

They are commercially available in a wide range of molecular weights and viscosities. Suitable polyethylene glycols that can be used in the present invention are selected for example from Dow Chemical Company or BASF respectively under the trade names Carbowax® and Pluriol E®.

The fluoropolymers suited as processing aid in the present invention are for example polymers of vinylidene fluoride ($H_2C=CF_2$) and/or copolymers of vinylidene fluoride and hexafluoropropylene ($F_2C=CF-CF_3$). Fluoropolymers suited as processing aids in the current invention are for example commercially available under the Dynamar®, Viton® and Kynar® trade names respectively from Dyneon, DuPont-Dow Elastomers or Arkema.

LIST OF FIGURES

The polymer resin suitable for rotomoulding applications must have a particle size of from 10 to 1000 micometres. In conventional techniques, the additivation and polymer fluff micronisation are carried out in two separate steps. The present invention only requires one micronisation step.

Figure 1:
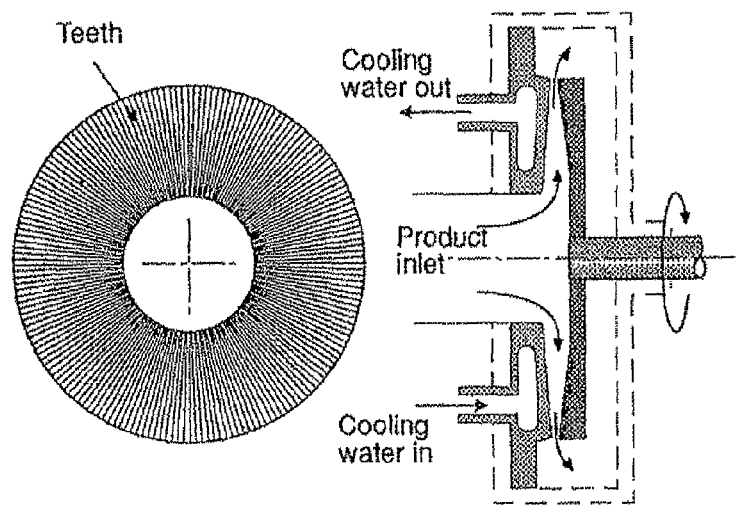
FIG. 1 represents typical vertical mill grinding plates for plastic powders and the feeding mechanism of the microniser (courtesy of Queen's University, Belfast).
Figure 2:
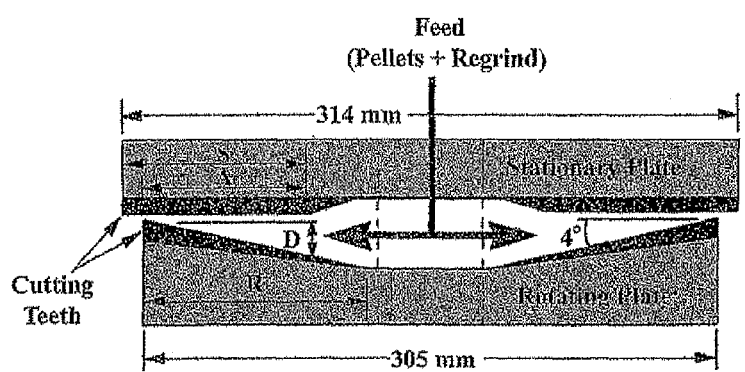
FIG. 2 represents typical horizontal plates for rotational moulding powders (courtesy of Queen's University, Belfast).

The grinding of polymers for rotational moulding is carried out in a microniser such as represented in FIGS. 1 and 2. Polymer fluff exiting the reactor and additives are fed into the grinder's feed hopper represented in FIG. 3. They are then fed into the throat of the mill by means of a vibratory feeder at a uniform and controlled rate. They are carried with a flow of air between two metal cutting plates, each equipped with radial cutting teeth. Said teeth are cut at an angle that is selected in order to decrease the gap between the cutting edges at the periphery: It is typically of 4 degrees. The pellets are pushed outwardly between the cutting plates by centrifugal force. They are therefore reduced in size when moving outward through the narrowing gap between the cutting plates. Optionally, the grinder system includes a second mill. When the particles have reached the desired size they escape from the gap. The number of cutting teeth and the gap width are selected according to the desired particle size.

During grinding, friction increases the temperature of the plates and polyethylene: it must be closely controlled so that it remains at least 5° C., preferably at least 10° C., lower than the melting temperature of the polymer. The exiting particles are next sent to a screening unit containing a number of sieves. The particles that do not pass the screening are sent back to the mill for further grinding.

The preferred polyethylene according to the present invention is a homo- or co-polymer of ethylene. It is produced by any known method in the art. It is preferably produced with a catalyst comprising a metallocene on a silica/aluminoxane support.

The melt index of the polyethylene resin preferably used in the present invention is typically at least equal to 0.5 dg/min, preferably of at least 1 dg/min. It is preferably at most equal to 25 dg/min, preferably of at most 20 dg/min. The melt flow index MI2 is measured following the method of standard test ASTM D 1283 at a temperature of 190° C. and a load of 2.16 kg.

The density is of at least 0.920 g/cc, preferably of at least 0.930 g/cc. It is of at most 0.965 g/cc, preferably of at most 0.960 g/cc. The density is measured following the method of standard test ASTM D 1505 at 23° C.

The polyethylene of the present invention may also have a bi- or multimodal molecular weight distribution. It may be a blend of two or more polyethylenes with different molecular weight distributions, which can be blended either physically or chemically. A chemical blend is typically produced in two or more serially connected reactors.

The polydispersity D of the polyethylene suitable for the present invention is in the range 2 to 20, preferably 2 to 15, more preferably less than or equal to 10, and most preferably less than or equal to 8, the latter range being typically associated with the preferred metallocene-prepared polyethylene resins. The polydispersity index D is defined as the ratio Mw/Mn of the weight average molecular weight Mw over the number average molecular weight Mn.

The resins of the present invention may also comprise other additives such as for example acid scavengers, antistatic additives, fillers, slip additives, anti-blocking additives or processing aid.

In this description, copolymers are prepared from one monomer and one or more comonomers. The polyethylene resin may advantageously be replaced by a dry blend of metallocene-prepared polyethylene resins having different properties in order to tailor the properties of the layer.

The finished rotomoulded article may contain one or more layers, one of which being the additivated polyethylene obtained by the process of the present invention.

The additivated polyethylene resin obtained by the process of the present invention is characterised in that it is free of solvent or diluent and in that it is free of alterations caused by extrusion or compounding. It therefore keeps excellent mechanical properties.

Figure 6:
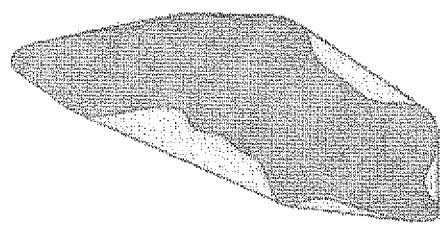
FIG. 6 represents a description of the method used to calculate the complexity factor and showing respectively the area of the particle and that of the polygone circumscribing the particle.

Surprisingly, it is observed that the form factor of the fluff is preserved after milling. The form factor is defined in terms of:
- circularity by the ratio C=Ae/Ai wherein Ae and Ai are respectively the radii of the circles inscribed and circumscribed around a particle. The ratio varies between 1 for a circle and infinity for a straight line.
- elongation by the ratio EI=$\Theta_{feret\ max}/\Theta_{feret\ min}$ wherein the Feret diameter is the projection length of the convex envelope of a particle in a given direction. The ratio varies between 1 for a circle and infinity for a line.
- convexity area by the ratio Cvx=A/$A_{Cv}$ wherein A and $A_{Cv}$ are respectively the area of the particle and that of the polygone circumscribing the particle as shown on FIG. 6. It varies between 0 for complex shapes and 1 for a circle.

Very surprisingly also, the micronised additivated fluff according to the present invention offers powder properties particularly well suited for rotomoulding applications. The powder of the invention has a smaller dry flow value and a larger bulk density than micronised additivated micronised pellets.

EXAMPLE

As re-test, a composition comprising polyethylene and a package of antioxidant and anti-UV additives was micronised under the following conditions:
Machine: Wedco single stage horizontal grinding mill, Model n° AC-12-R.
Grinding gap: 350 micrometres
Mill teeth: 480 teeth on both top and bottom plates
Plate diametre: 305 mm
Grinding temperature, measured at plates: 65 to 70° C.

Micronisation was then carried out in a twin-mill system from Reduction Engineering, RE400, under the following conditions:
Blower: 7.5 kW
Feeder: 1 kW
Output: about 600 kg/h.
Mill 1
grinding temperature: 75° C.
power: 55 kW (used at 100%)
gap: 500 micrometres (20/1000")
plate diameter: 432 mm (17")
mill teeth: 360 or 480 depending upon polyethylene.
Mill 2
grinding temperature: 46° C.
power: 22 kW (used at 80%)
gap: 180 micrometres (7/1000")
plate diameter: 432 mm (17")
mill teeth: 360 or 480 depending upon polyethylene.

Three resins were tested:
R1 is a polyethylene resin commercially available from Dow Chemicals under the name Dow 2432®, under the form of pellets. The resin contains a package of additives.

R2 is a metallocene-prepared polyethylene resin commercially available from Total Petrochemicals under the name M4041 UV®. It has a density of 0.940 g/cc a melt index of 4.0 dg/min and contains a package of additives, it is sold under the form of pellets.

R3 is a metallocene-prepared polyethylene resin commercially available from Total Petrochemicals under the name M4040®. It is the ex-reactor fluff of resin R2, has a density of 0.940 g/cc, a melt index of 4.0 dg/min and does not contain any additives.

Resin R4 is the same resin as R3 dry blended with 0.25 wt %, based on the total weight of resin and additives, of Irgafos 168, 0.125 wt % of irganox 1010 and 0.2 wt % of Cyasorb TNT 4611.

Resin R5 is the ex-reactor fluff of a metallocene-prepared polyethylene resin commercially available from Total Petrochemicals under the name M3580®. It has a density of 0.935 g/cc, a melt index of 8.0 dg/min and is dry blended with the same package of additives as resin R4.

Figure 3:
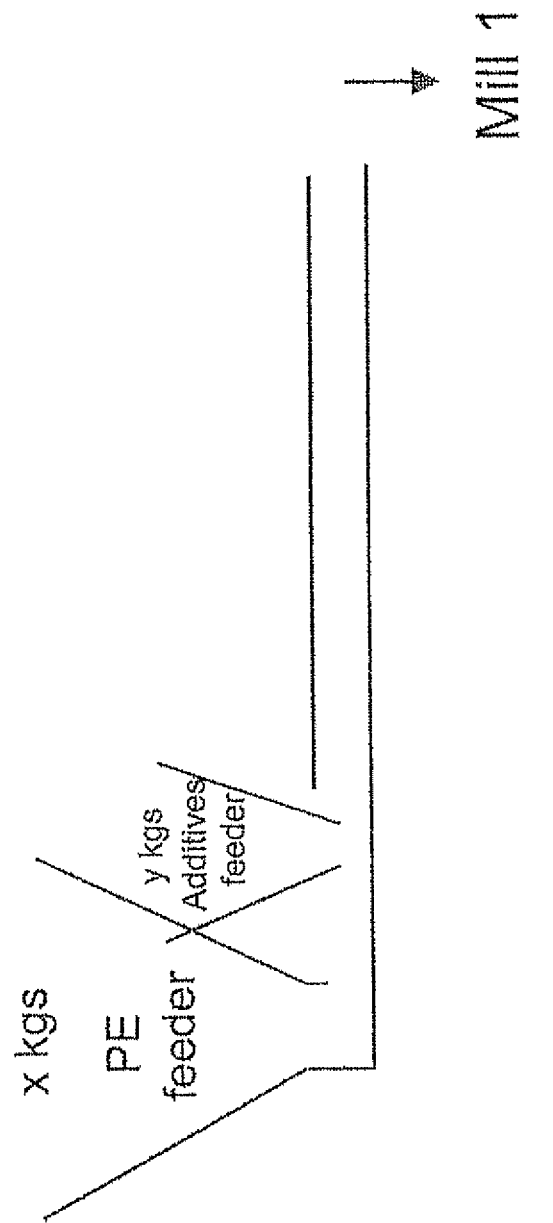
FIG. 3 represents the set up that was used to combine the polyethylene fluff and the additives in the feeder leading to the mill.

These additives for resins R4 and R5 were fed in the additive feeder as represented in FIG. 3.

The grinding results obtained with the twin-mill extruder are summarised in Table 1.

TABLE 1

| Resin | mill 1 T ° C. | mill 1 power kW | mill 2 T ° C. | mill 2 power kW | output kg/h | energy kW | kW/ton |
|---|---|---|---|---|---|---|---|
| R1 | 75.6 | 55 | — | 17.6 | 635 | 81.1 | 127.7 |
| R2 | 70.55 | 55 | 45 | 17.6 | 735 | 81.1 | 110.3 |
| R3 | 56.68 | 50 | 38.3 | 14.5 | 1143 | 73 | 63.9 |
| R4 | 76.11 | 55 | 45.56 | 15.4 | 1208 | 18.9 | 65.3 |
| R5 | 75.0 | 55 | 48.9 | 14.6 | 1230 | 78.1 | 63.5 |

Figure 4:
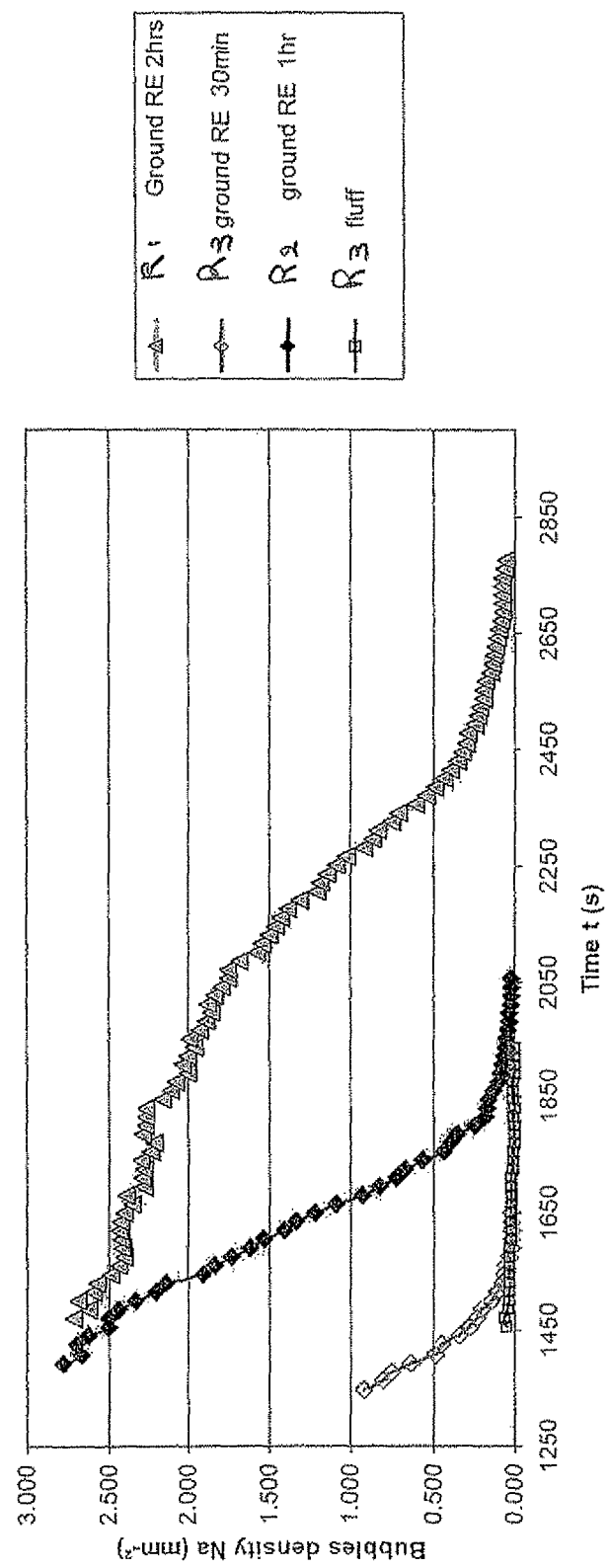
FIG. 4 represents the sintering temperature expressed in ° C. as a function of time expressed in seconds.
Figure 5:
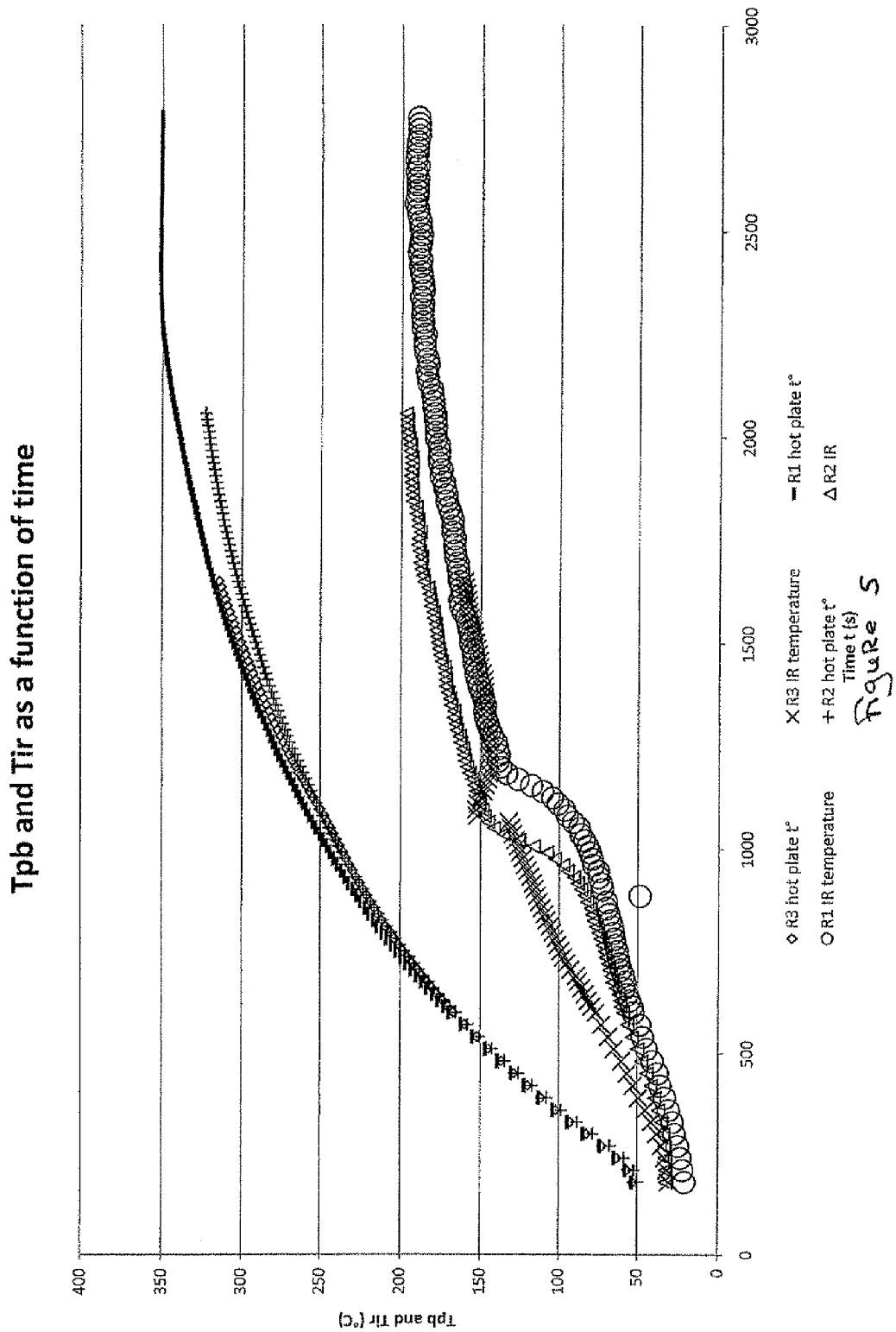
FIG. 5 represents the densification represented by bubbles density expressed in number of bubbles per square mm as a function of time expressed in s.

Resin R3 had the best sintering and densification behaviours as can be seen from FIGS. 4 and 5 representing respectively the sintering time and densification time for resins R1 to R3.

In addition, as seen in Table 1, the consumption of energy necessary to micronise the fluff is much smaller than that needed to grind the pellets: it is at most 60% of the energy needed to grind pellets of the same polyethylene resin under the same grinding conditions. It must be further noticed that the energy consumed to extrude the pellets, of from 200 to 400 kW/ton, must be added to the higher energy needed to microne said pellets. For resin R2 the amount of energy required to extrude the additivated pellets was of about 250 kW/ton. The total energy consumed to produce ground R2 was thus of about 370 kW/ton versus 65 kW/ton to micronise and additivate fluff R4.

Pellets of resin R2, pure fluff R3 and additivated fluff R4 have been micronised under the same conditions.

Figure 7:
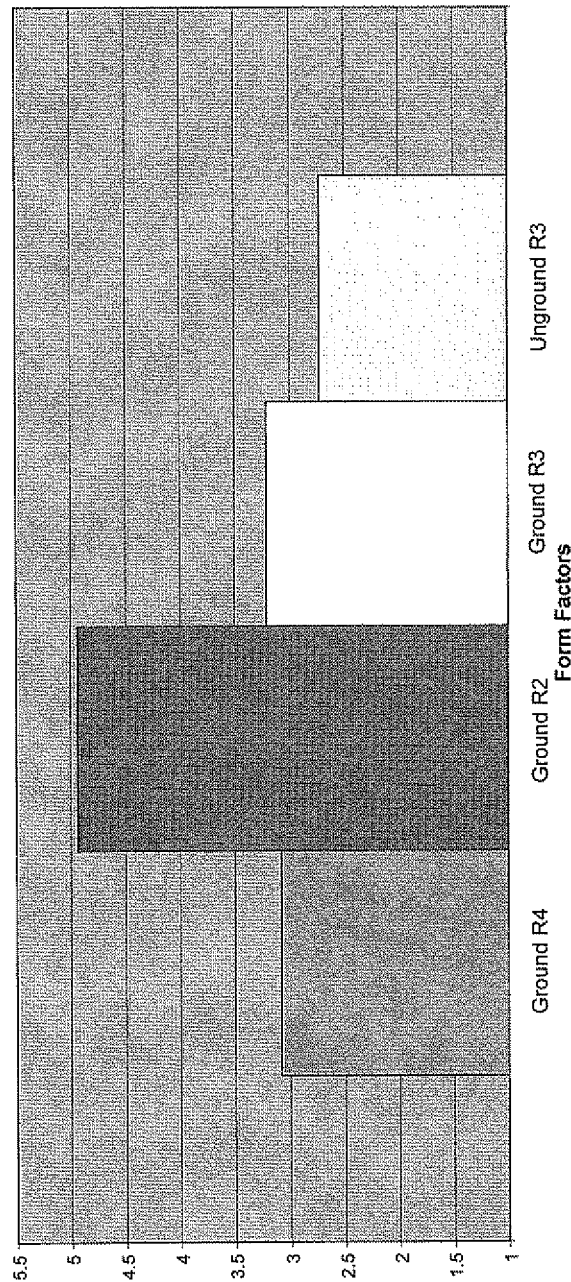
FIG. 7 is a block diagram representing the circularity factor respectively of micronised fluff with additives, micronised pellets, micronised fluff without additives and unground fluff.
Figure 8:
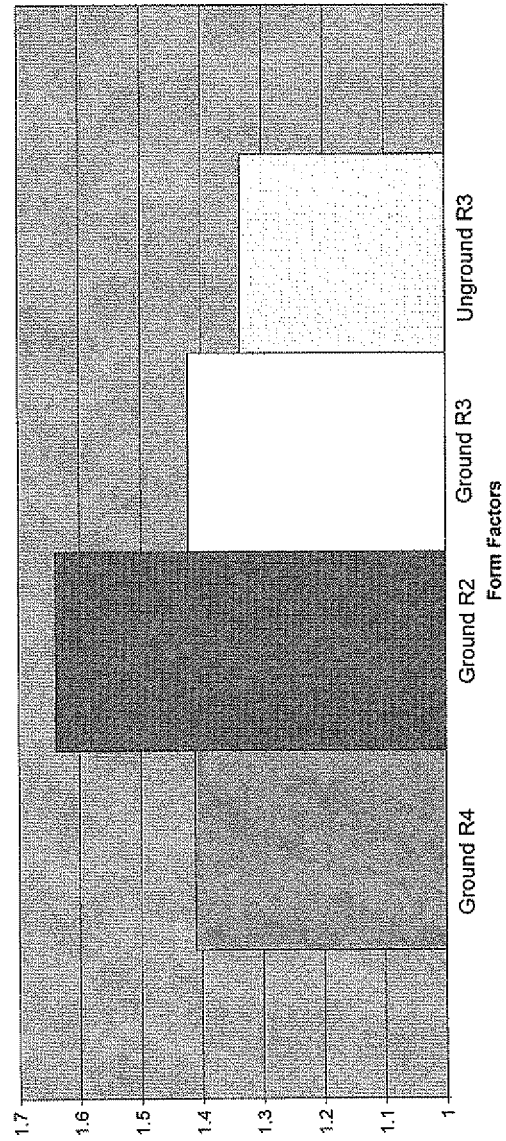
FIG. 8 is a block diagram representing the elongation factor respectively of micronised fluff with additives, micronised pellets, micronised fluff without additives and unground fluff.
Figure 9:
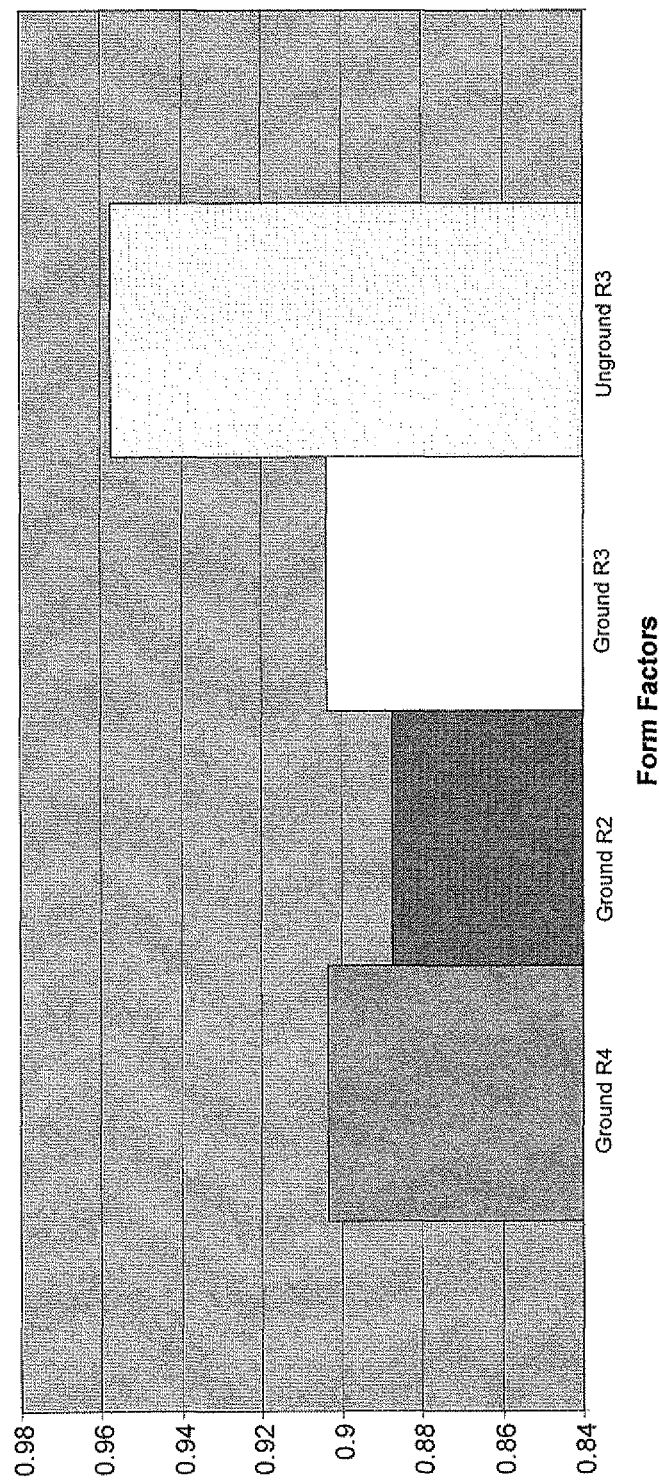
FIG. 9 is a block diagram representing the complexity factor respectively of micronised fluff with additives, micronised pellets, micronised fluff without additives and unground fluff.

The shape factors of circularity, elongation and complexity are represented respectively in FIGS. 7, 8 and 9. It can be seen that the additivated and non additivated ground fluffs have a very similar circularity and elongation as the ex-reactor unground fluff.

The dry flow and bulk density for micronised resins R2, R3 and R4 are presented in Table 2. It is observed that the micronised fluff whether additivated or not has better dry flow, i.e. lower dry flow, and better bulk density, i.e. higher bulk density, than the micronised pellets

TABLE 2

| Resin | Dry flow s/100 g | Bulk density g/cc |
|---|---|---|
| R2 | 28.5 | 34.3 |
| R3 | 21.4 | 38.3 |
| R4 | 22.5 | 37.2 |

The invention claimed is:

1. A method comprising:
 a) feeding into a microniser:
  i) polymer fluff directly exiting a reactor; and additives comprising:
  ii) phenolic antioxidant;
  iii) organic phosphite or phosphonite antioxidant;
  iv) anti-UV stabiliser;
  v) optionally metal stearate;
  vi) optionally densification aid; and
  vii) optionally pigments; to form a dry blend
 b) micronising the dry blend, while maintaining the dry blend at a temperature of from about 25°C. to at least 5° C. below the melting temperature of the polymer fluff, in order to obtain additivated polymer powder having an homogeneous size of from 10 to 1000 micrometres for rotomoulding;
 c) retrieving the additivated polymer powder;
 wherein no pre-treatment is performed prior to feeding the polymer fluff and the additives to the microniser, the pre-treatment that is used to add the additives to the polymer includes compounding, extrusion, use of solvent, or use of diluent.

2. The method of claim 1 wherein the polymer is polyethylene or polypropylene.

3. The method of claim 1 wherein the temperature in the microniser is maintained at a temperature that is at least 10 °C. below the melting temperature of the polymer.

4. The method of claim 1 wherein the phenolic antioxidant is octadecyl 3-(3',5'-di-t-butyl-4-hydroxyphenyl)propionate, pentaerythrityl-tetrakis(3-(3',5'-di-t-butyl-4-hydroxyphenyl) propionate, or a blend thereof.

5. The method of claim 1 wherein the organic phosphite or phosphonite is bis(2-methyl-4,6-bis(1,1-dimethylethyl)phenyl) phosphorous acid ethylester, tris-nonylphenyl phosphite, tetrakis-(2,4-di-t-butylphenyl)-4,4'-biphenylen-di-phosphonite, cyclic butylethyl propandiol, 2,4,6-tri-t-butylphenyl ester, or a blend thereof.

6. The method of claim 1 wherein the UV-stabiliser is a hindered amine light stabiliser.

7. The method of claim 1 wherein the dry blend comprises the metal stearate.

8. The method of claim 1 wherein the densification aid is present and is a mixture of a polyetherester as major component with a minor component selected from the group consisting of polyether-block co-polyamide, thermoplastic polyurethane, polyethylene glycol and fluoropolymer.

9. The method of claim 1 wherein the polymer is polyethylene having a density of from 0.920 to 0.965 g/cc and a melt index of from 0.5 to 25 dg/min.

10. The method of claim 1 wherein the polymer is polyethylene having a polydispersity index of from 2 to 10.

11. The method of claim 1 wherein the polymer is polyethylene, and wherein the energy consumed to micronise the polymer fluff is less than 60% of the energy consumed to micronise the pellets for the same polyethylene resin and under the same micronising conditions.

12. The method of claim 1 wherein the dry blend comprises the metal stearate, and wherein the metal stearate is zinc stearate or calcium stearate.

13. The method of claim 1, wherein the additivated polymer powder is characterised in that it is free of solvent or diluent.

14. The method of claim 1, wherein the method only includes one micronisation step.

* * * * *